Dec. 27, 1949     H. L. COONRADT     2,492,622
CONTINUOUS PROCESS FOR PREPARING HALOTHIOPHENES
Filed Jan. 24, 1947
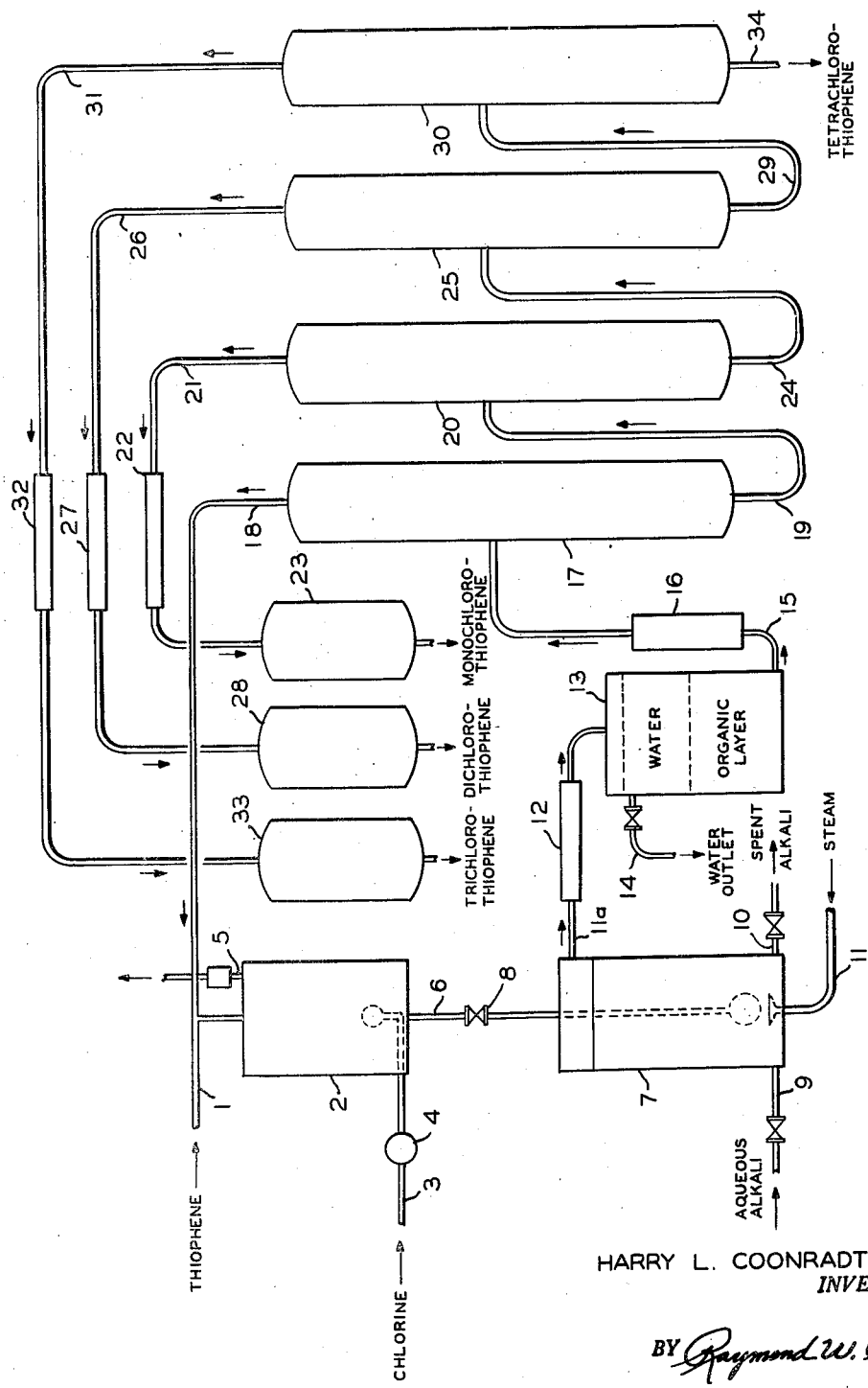
HARRY L. COONRADT
*INVENTOR.*
BY Raymond W. Barclay
ATTORNEY OR AGENT Patented Dec. 27, 1949

2,492,622

UNITED STATES PATENT OFFICE 2,492,622

CONTINUOUS PROCESS FOR PREPARING HALOTHIOPHENES

Harry L. Coonradt, Woodbury, N. J., assignor to Socony-Vacuum Oil Company, Incorporated, a corporation of New York Application January 24, 1947, Serial No. 724,213

12 Claims. (Cl. 260—329)

This invention relates to a continuous process for preparing pure halogenated derivatives of thiophene or alkylthiophenes. More particularly, the present invention is directed to a continuous method for preparing pure chlorothiophenes, bromothiophenes and alkyl derivatives thereof.

The direct reaction between thiophene and halogens, such as chlorine or bromine, is well known in the art and proceeds easily and rapidly under normal conditions to yield a thiophene-halogen reaction mixture comprising unreacted thiophene, monohalogenated thiophene, various polyhalogenated thiophenes and chlorine addition products, the proportion of each being commensurate with the particular degree of halogenation involved. Thus, in the reaction of thiophene with chlorine, chloro-substituted thiophenes obtained in admixture have included monochlorothiophene, dichlorothiophene, trichlorothiophene and tetrachlorothiophene. The amounts of the various chlorothiophenes obtained, along with the amount of unreacted thiophene which can be recovered, is dependent upon the conditions under which the chlorination is effected and particularly upon the relative proportions of thiophene and chlorine which are brought into contact.

Attempts in the past to separate the resulting thiophene-chlorine reaction mixture into the various chlorothiophenes by fractional distillation thereof have lead to the evolution of hydrogen chloride in considerable quantity and the chlorothiophenes so obtained, if any, were not pure. To obtain pure chlorothiophenes, the original method, developed over sixty years ago and accredited to Victor Meyer, has heretofore generally been employed. This method involves heating the crude chlorination reaction mixture with alcoholic potassium hydroxide for several hours to destroy hydrogen chloride addition products, followed by addition of water and subsequent steam distillation and fractionation of the mixture so obtained to yield the various chlorothiophenes. A similar method has likewise been employed for the purification of the reaction product of thiophene with bromine.

It is evident that such a process does not readily lend itself to a commercially feasible method for producing pure chlorothiophenes. In particular, the process heretofore used was not adaptable to continuous operation. In addition to being a slow drawn-out operation, the aforementioned procedure when carried out on a commercial basis is unattractive from an economical point of view since the loss of alcohol or the expense of recovering the alcohol from the spent potassium hydroxide solution would greatly increase the overall cost of production. Furthermore, the excessive amount of fuel consumed during the extended heating period of the thiophene-chlorine reaction mixture with alcoholic potassium hydroxide and the labor cost which would be involved during said period render the process totally inadequate as an efficient commercial method for preparing pure chlorothiophenes.

In accordance with the present invention there has now been discovered a continuous method of preparing pure halogenated thiophenes which overcomes the disadvantages inherent in the process heretofore employed. Broadly stated, the process contemplated herein comprises continuously contacting thiophene or an alkylthiophene with a halogen such as chlorine or bromine, flowing a stream of the resulting halogenated mixture into an aqueous alkaline solution, continuously steam-distilling said solution and condensing the overhead ensuing therefrom to yield a distillate composed of a water layer and an organic layer, withdrawing a stream of said organic layer and distilling the same to recover unreacted thiophene constituent therefrom which may be recycled for further contact with halogen, and fractionally distilling the bottom product from the initial distillation to yield pure halogenated derivatives of the thiophene reactant.

It has been found that by carrying out the treatment of crude thiophene-chlorine or thiophene bromine reaction mixtures according to the above procedure, the excessively long heating periods such as have heretofore been necessary with the use of alcoholic potassium hydroxide can be substantially eliminated. The various halogenated thiophenes obtained as a result of the continuous procedure described herein are of a high degree of purity and the process of their preparation represents an efficient, comparatively rapid method in comparison with the time-consuming process of the prior art. Moreover, the method of this invention is a simple, continuous procedure for preparing pure chlorinated or brominated thiophenes and is particularly applicable to operations on a large scale since the economics of the process are extremely attractive. Thus, the continuous method described herein eliminates the use of alcohol heretofore deemed essential for preparing the potassium hydroxide solution used in the prior art procedure and consequently dispenses with the need of a recovery system for said alcohol. Also, the process of this invention, being continuous, permits a much greater amount of the pure bromo- or chlorothiophenes to be obtained in a given time as compared with the method heretofore employed. This, in turn, causes a substantial reduction in the expenditure required per unit of pure halothiophene obtained and hence gives rise to a highly economical and efficient method of production.

It is, accordingly, an object of the present invention to provide a continuous process for preparing pure bromo- or chlorothiophenes. Another object is the provision of a continuous process for preparing pure bromo- or chlorothiophenes wherein the extensive heating period necessary to the prior art procedure can be substantially eliminated to provide a rapid, efficient process. A still further object is to afford a continuous process for preparing pure bromo- or chlorothiophenes or alkyl derivatives thereof which is adaptable for commercial operation. A very important object is the provision of an economical, rapid, effective method for obtaining pure halogenated derivatives of thiophene or alkylthiophenes from crude reaction mixtures thereof.

These and other objects which will be recognized by those skilled in the art are attained in accordance with the present invention wherein pure hologenated thiophenes or alkylthiophenes are obtained by continuously contacting the crude mixture resulting upon the bromination or chlorination of thiophene or an alkylthiophene with an aqueous alkaline solution and continuously steam-distilling the resulting solution. The distillate so obtained, composed of a water phase and an organic phase, is separated by mechanical means, and a stream of the organic phase is fractionated to recover unreacted thiophene or alkylthiophene therefrom and then subjected to further fractional distillation to yield the various halogen derivatives present in substantially pure form.

As pointed out above, the relative amounts of each of the particular chlorothiophenes or bromothiophenes obtained will depend to a large extent upon the degree to which the thiophene is halogenated. Generally speaking, varying amounts of the mono-, di-, tri- and tetrahalogenated derivatives will be obtained under practically all conditions. With a small degree of chlorination or bromination, however, the 2-halogenated derivative will be the predominant halogen product. When relatively larger amounts of chlorine or bromine are contacted with thiophene, the dihalogenated product is obtained in substantial yield along with the monohalogenated product. As a general rule, as the degree of halogenation is increased, the yields of tri- and tetrahalogenated thiophenes correspondingly increase in proportion to the amounts of the mono- and di-substituted halogen derivatives. It will thus be understood that the relative amounts of each of the chlorinated or brominated derivatives of thiophene obtained in accordance with the method contemplated herein will largely depend upon the conditions under which the initial halogenation reaction is carried out. Under the usual conditions, thiophene and halogen are contacted at atmospheric pressure and at room temperature or slightly higher. The temperature at which halogenation is effected will be at or below the boiling point of thiophene or alklylthiophene being treated. Thus, in the chlorination or bromination of thiophene, the reaction temperature will generally be between about 0° C. and about 80° C. The halogenation of thiophene may be carried out in any suitable manner wherein the thiophene and halogen are brought into intimate contact. Generally, the halogen will be run into thiophene or alkyl derivative thereof at a rate which will insure thorough mixing and contact of the two reactants.

A stream of the resulting crude chlorination or bromination reaction mixture is continuously slowly added to an aqueous alkaline solution. Generally, any of the commonly employed alkalies which are substantially soluble in water can be used for this purpose. For practical purposes, however, alkali metal compounds and alkaline earth compounds will ordinarily be employed. Representative of the aqueous alkaline solutions used are the hydroxides and weak acid salts of the alkali and alkaline earth metals in particular, sodium hydroxide, sodium carbonate, potassium hydroxide, potassium carbonate, calcium hydroxide and barium hydroxide. Addition of the halogenation reaction mixture to aqueous alkaline solution is generally carried out by slowly adding the halogenation mixture below the surface of a hot aqueous alkaline solution. Addition below the surface apparently assures better contact between the constituents and reduces mechanical carry-over. In most instances where the halogenated reaction mixture was not added below the surface of the aqueous alkaline solution, a trace of hydrogen halide was detected in the higher boiling products. Accordingly, a preferred aspect of the present process is the addition of halogenated thiophene mixture to aqueous alkaline solution below the surface thereof. The amount of the particular alkaline solution employed will vary with the initial degree of halogenation and generally the heavily holagenated thiophene mixtures will require a more alkaline solution to completely remove acidic materials therefrom. It will accordingly be understood that the amount and concentration of the aqueous alkaline solution employed herein may vary to a considerable extent, depending upon the proportion of acidic material present in the crude mixture resulting from the halogenation of thiophene or alkylthiophene. It will further be understood that the strength of the alkaline solution will be such as to remove completely the acidic material from the crude halogenation mixture.

The solution resulting upon addition of the halogen thiophene mixture to the aqueous alkaline solution is continuously subjected to steam distillation. The steam distillate obtained as a result of said distillation consists of an organic layer and an overlying water layer. The two phases are suitably separated by mechanical means. Usually simple gravitational settling will effect a substantially complete separation of the two phases. A stream of the organic layer so obtained is in some instances desirably dried to remove traces of water therefrom before being subjected to fractionation. If the separation of organic and water phases is carefully carried out, however, the drying step may be eliminated. Under some circumstances it may be desirable to carry out the fractionation of the stream of organic steam distillate over alkalis such as sodium or potassium hydroxide as a further precaution in removing all traces of hydrogen halide from the distillate. Usually, however, in employing the above described technique, fractionation over alkalis will not generally be found necessary. Upon continuous fractionation of the organic steam distillate, any unreacted thiophene present is recovered and may be recycled for further halogenation. Further fractional distillation of the bottom product resulting from the initial distillation yields the mono-, di-, tri-, and tetrahalogenated thiophenes in substantially pure form.

The above described process may be used in preparing pure monochlorothiophene, dichlorothiophene, trichlorothiophene, tetrachlorothiophene, monobromothiophene, dibromothiophene, tribromothiophene and tetrabromothiophene. By employing an alkyl derivative of thiophene, such as methyl, ethyl, propyl, butyl, etc., derivatives, the corresponding pure chloro- or bromo-compounds can be prepared. Thus, the process of this invention contemplates the preparation of pure 2-methyl-monochlorothiophene; 2-methyl-monobromothiophene; 2-methyl-dichlorothiophene, 3-methyl-dichlorothiophene, 3-methyl-trichlorothiophene; 2-ethyl-trichlorothiophene, 3-ethyl-dichlorothiophene; 2-propyl-monobromothiophene; 2-propyl-trichlorothiophene, and the like.

A suitable apparatus for carrying out the above described continuous process is shown in the attached drawing, wherein thiophene is continuously chlorinated to yield the various chlorinated thiophenes. Referring more particularly to the flow diagram, thiophene is introduced through conduit 1 to reactor 2, and chlorine is introduced through conduit 3 and is permitted to bubble upwards through the counter-flowing thiophene. The amount of chlorine added to the reactor is measured by a rotameter 4 inserted in line 3. The reactor is furnished with a vent 5 to remove gaseous products produced during the course of the chlorination reaction. The resulting crude thiophene-chlorine reaction mixture flows from the bottom of the reactor through outlet 6 and passes below the surface of an aqueous alkaline solution contained in vessel 7, the rate of flow being suitably controlled by valve 8. A stream of aqueous alkali is supplied to the aforesaid vessel through inlet 9 and the spent alkaline solution is withdrawn through outlet 10. Steam is continuously supplied to the alkaline solution through conduit 11, effecting a steam distillation of the mixture contained in the vessel and the overhead from said distillation passes through outlet 11a and condenser 12 to settling tank 13, wherein the heavier organic materials contained in the distillate settle to the bottom of the tank while water, being the lighter constituent in the distillate, forms a layer overlying the heavier organic phase. A stream of water is continuously withdrawn from the upper portion of the settling tank through outlet 14 while a stream of the organic layer is withdrawn from the bottom of the settling tank through outlet 15 and passes through a drier 16 to a fractionating tower 17 which is maintained at a temperature such that any unreacted thiophene present in the mixture passes overhead through outlet 18, is condensed and recycled to the reactor for further chlorination. The bottom product from fractionating tower 17 passes through outlet 19 to a second fractionating tower 20 which is maintained at such a temperature that monochlorothiophene passes overhead through outlet 21 and condenser 22 to storage tank 23. The bottom product remaining in fractionating tower 20 is withdrawn through outlet 24 and passes through a third fractionating tower 25 which is maintained at a temperature such that dichlorothiophene passes overhead through outlet 26 and condenser 27 to storage tank 28. The bottom product from fractionating tower 25 is withdrawn through outlet 29 and passes to a fourth fractionating tower 30 which is maintained at a temperature such that tri-chlorothiophene passes overhead through outlet 31 and condenser 32 to storage tank 33. The bottom product from fractionating tower 30 is substantially pure tetrachlorothiophene and may be withdrawn therefrom through outlet 34.

The following examples will serve to illustrate the method of this invention without limiting the same:

Example 1

One thousand six hundred eighty-three grams of thiophene (20 moles) were reacted at a temperature of 25–35° C. with gaseous chlorine until 20 moles of chlorine had been added. The chlorine was measured by a rotameter. The weight of crude reaction product was 2,485 grams. Four hundred grams of the reaction product were continuously added in a small stream to 1,000 milliliters of hot 10 per cent by weight sodium carbonate solution and the volatile materials were continuously steam-distilled therefrom. The organic distillate was separated from the water that had distilled and was then fractionated to give the following:

| | Per cent |
|---|---|
| 52 grams thiophene (recovered) | 19 |
| 180 grams monochlorothiophene | 47 |
| 56 grams dichlorothiophene | 11 |

Yields were based on the weight of thiophene used.

Example 2

One thousand six hundred eighty-three grams of thiophene (20 moles) were reacted at a temperature of 25–35° C. with gaseous chlorine until 20 moles of chlorine had been added. The weight of the crude reaction product was 2,508 grams. Eight hundred grams of the reaction product were washed with 100 milliliters of water and continuously slowly added below the surface of a hot 10 per cent by weight aqueous sodium carbonate solution. The volatile materials were continuously steam-distilled therefrom and the resulting steam distillate separated into an organic layer and an overlying water layer. The organic layer was dried over sodium sulfate and fractionated to give the following:

| | Per cent |
|---|---|
| 97 grams thiophene (recovered) | 18 |
| 341 grams monochlorothiophene | 45 |
| 137 grams dichlorothiophene | 14 |

Yields were based on the weight of thiophene used.

Example 3

One thousand six hundred eighty-three grams of thiophene (20 moles) were reacted at a temperature of 25–35° C. with gaseous chlorine until the weight of the reaction mixture was 2,495 grams. The chlorine was measured by a rotameter and the amount of chlorine added was equivalent to 1 mole of chlorine per mole of thiophene. Four hundred grams of the resulting thiophene-chlorine reaction product mixture were heated under reflux with stirring with 1000 grams of a 10 per cent alcoholic potassium hydroxide solution for a period of 24½ hours. The precipitated salt obtained was removed by filtration. The resulting filtrate was diluted with water and the organic material which separated was removed. The remaining water layer was extracted twice with petroleum ether and the extracts so obtained were added to the organic material. The organic materials were then dried over sodium sulfate and fractionated to give the following:

|  | Per cent |
|---|---|
| 40 grams thiophene (recovered) | 14 |
| 162 grams monochlorothiophene | 43 |
| 70 grams dichlorothiophene | 14 |

Yields were based on the weight of thiophene used.

It is to be noted, in comparing the results of the examples illustrating the continuous method of the present invention with the batch process previously used, as illustrated by Example 3, that in order to obtain substantially the same yields of products, it was necessary in using the prior art method to treat the crude chlorination mixture with alcoholic potassium hydroxide for an extended period. This excessively long heating period has been eliminated by the continuous method of this invention to provide a more rapid and efficient procedure for preparing pure halothiophenes.

I claim:

1. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture into an aqueous alkaline solution, the alkali concentration of which is sufficient to remove completely acidic material from said halogenated mixture, immediately and continuously steam-distilling said solution and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure halogenated derivatives of the initial thiophene reactant.

2. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture into an aqueous alkaline solution, the alkali concentration of which is sufficient to remove completely acidic material from said halogenated mixture, immediately and continuously steam-distilling said solution and condensing the overhead ensuing therefrom to yield an organic distillate with an overlying water layer, withdrawing a stream of said organic distillate and fractionating the same to recover unreacted thiophene constituent therefrom, recycling said constituent to further contact with halogen, fractionally distilling the bottom product from the aforesaid fractionation to yield pure halogenated derivatives of the initial thiophene reactant.

3. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture below the surface of an aqueous alkaline solution, the alkali concentration of which is sufficient to remove completely acidic material from said halogenated mixture, immediately and continuously steam-distilling said solution and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure halogenated derivatives of the initial thiophene reactant.

4. A continuous process of preparing pure chlorothiophenes, comprising continuously contacting a material selected from the group consisting of thiophene and alkylthiophene with chlorine, flowing a stream of the resulting chlorinated mixture into an aqueous alkaline solution, the alkali concentration of which is sufficient to remove completely acidic material from said chlorinated mixture, immediately and continuously steam-distilling said solution and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure chlorinated derivatives of the initial thiophene reactant.

5. A continuous process of preparing pure bromothiophenes, comprising continuously contacting a material selected from the group consisting of thiophene and alkylthiophene with bromine, flowing a stream of the resulting brominated mixture into an aqueous alkaline solution, the alkali concentration of which is sufficient to remove completely acidic material from said brominated mixture, immediately and continuously steam-distilling said solution and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure brominated derivatives of the initial thiophene reactant.

6. A continuous process of preparing pure chlorothiophenes, comprising continuously contacting a material selected from the group consisting of thiophene and alkylthiophene with chlorine, flowing a stream of the resulting chlorinated mixture below the surface of an aqueous alkaline solution, the alkali concentration of which is sufficient to remove completely acidic material from said chlorinated mixture, immediately and continuously steam-distilling said solution and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure chlorinated derivatives of the initial thiophene reactant.

7. A continuous process of preparing pure bromothiophenes, comprising continuously contacting a material selected from the group consisting of thiophene and alkylthiophene with bromine, flowing a stream of the resulting brominated mixture below the surface of an aqueous alkaline solution, the alkali concentration of which is sufficient to remove completely acidic material from said brominated mixture, immediately and continuously steam-distilling said solution and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure brominated derivatives of the initial thiophene reactant.

8. A continous process of preparing pure chlorothiophenes, comprising contacting thiophene with chlorine, flowing a stream of the resulting chlorinated mixture into a aqueous alkaline solution, the alkali concentration of which is sufficient to remove completely acidic material from said chlorinated mixture, immediately and continuously steam-distilling said solution and condensing the overhead ensuing therefrom to yield an organic distillate with an overlying water layer, withdrawing a stream of said organic distillate and fractionating the same to recover unreacted thiophene therefrom, recycling said thiophene to further contact with chlorine, fractionally distilling the bottom product from the aforesaid fractionation to yield pure chlorothiophenes.

9. A continuous process of preparing pure chlorothiophenes, comprising contacting thiophene with chlorine, flowing a stream of the resulting chlorinated mixture below the surface of an aqueous solution, the alkali concentration of which is sufficient to remove completely acidic material from said chlorinated mixture, immediately and continuously steam-distilling said solution and condensing the overhead ensuing therefrom to yield an organic distillate with an overlying water layer, withdrawing a stream of said organic distillate and fractionating the same to recover unreacted thiophene therefrom, recycling said thiophene to further contact with chlorine, fractionally distilling the bottom product from the aforesaid fractionation to yield pure chlorothiophenes.

10. A continuous process of preparing pure chlorothiophenes, comprising contacting thiophene with chlorine, flowing a stream of the resulting chlorinated mixture into an aqueous sodium carbonate solution, the concentration of which is sufficient to remove completely acidic material from said chlorinated mixture, immediately and continuously steam-distilling said solution and condensing the overhead ensuing therefrom to yield an organic distillate with an overlying water layer, withdrawing a stream of said organic distillate and fractionating the same to recover unreacted thiophene therefrom, recycling said thiophene to further contact with chlorine, fractionally distilling the bottom product from the aforesaid fractionation to yield pure chlorothiophenes.

11. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture into an aqueous alkaline solution, the alkali concentration of which is sufficient to remove completely acidic material from said halogenated mixture, immediately and continuously steam-distilling said solution and condensing the overhead ensuing therefrom to yield an organic distillate with an overlying water layer, withdrawing a stream of said organic distillate and fractionally distilling the same to yield pure halogenated derivatives of the initial thiophene reactant.

12. A continuous process of preparing pure chlorothiophenes, comprising continuously contacting a material selected from the group consisting of thiophene and alkylthiophene with chlorine, flowing a stream of the resulting chlorinated mixture into an aqueous alkaline solution, the alkali concentration of which is sufficient to remove completely acidic material from said chlorinated mixture, immediately and continuously steam-distilling said solution and condensing the overhead ensuing therefrom to yield an organic distillate with an overlying water layer, withdrawing a stream of said organic distillate and fractionally distilling the same to yield pure chlorinated derivatives of the initial thiophene reactant.

HARRY L. COONRADT.

REFERENCES CITED

The following references are of record in the file of this patent:
Ber. 17, 794–5 (1884).
Ber. 19, 650 (1886).
Weygand: "Organic Preparations," page 77, Interscience Publishers, 1945.